US00RE41858E

(19) United States
(12) Reissued Patent
Duschek et al.

(10) Patent Number: US RE41,858 E
(45) Date of Reissued Patent: Oct. 26, 2010

(54) PEARLESCENT PIGMENT FOR WATER-BORNE SURFACE-COATING SYSTEMS

(75) Inventors: Joachim Duschek, Pfungstadt (DE); Ralf Glausch, Muehltal (DE)

(73) Assignee: Merck Patent Gesellschaft MIT Beschrankter Haftung, Darmstadt (DE)

(21) Appl. No.: 12/574,739

(22) Filed: Oct. 7, 2009

Related U.S. Patent Documents

Reissue of:
(64) Patent No.: 5,472,491
Issued: Dec. 5, 1995
Appl. No.: 08/265,721
Filed: Jun. 24, 1994

(30) Foreign Application Priority Data

Jun. 24, 1993 (DE) ..... P 43 21 005

(51) Int. Cl.
*C09C 1/00* (2006.01)
*C09C 1/14* (2006.01)
*C09C 1/36* (2006.01)
*C04B 14/20* (2006.01)
*C04B 14/04* (2006.01)

(52) U.S. Cl. ..... 106/446; 106/415; 106/417; 106/418; 106/438; 106/439; 106/448; 106/490

(58) Field of Classification Search ..... 106/415, 106/417, 418, 438, 439, 446, 448, 490
See application file for complete search history.

(56) References Cited

U.S. PATENT DOCUMENTS

| | | | | |
|---|---|---|---|---|
| 3,513,007 | A | 5/1970 | Lederer et al. | |
| 4,482,389 | A | 11/1984 | Franz et al. | |
| 4,828,623 | A | 5/1989 | Nitta et al. | |
| 5,108,736 | A | 4/1992 | Schlossman | |
| 5,223,034 | A | 6/1993 | Nitta et al. | |
| 5,270,352 | A | 12/1993 | Carpenter et al. | |
| 5,282,897 | A | 2/1994 | Bugnon et al. | |
| 5,472,491 | A * | 12/1995 | Duschek et al. | 106/418 |
| 5,759,255 | A * | 6/1998 | Venturini et al. | 106/418 |
| 7,413,599 | B2 * | 8/2008 | Henglein et al. | 106/415 |
| 2006/0042508 | A1 * | 3/2006 | Henglein et al. | 106/415 |

FOREIGN PATENT DOCUMENTS

| | | | |
|---|---|---|---|
| EP | 104516 | | 4/1984 |
| EP | 268918 | | 6/1988 |
| EP | 342533 | | 11/1989 |
| EP | 416 395 | | 3/1991 |
| EP | 0406731 | W | 9/1991 |
| EP | 0 649 886 | * | 4/1995 |
| EP | 632109 | B1 | 8/1998 |
| EP | 1682622 | | 7/2006 |
| JP | 63-230777 | | 9/1988 |
| JP | 1-158077 | | 6/1989 |
| JP | 3-217463 | | 9/1991 |
| JP | 4-249584 | | 9/1992 |

OTHER PUBLICATIONS

FTZ Chemicals, Manchem Ltd., "MANCHEM® Zircoaluminate Coupling Agents," Technical Data(no date).
Hulls Aktiengesellschaft, *Metal–acid esters/–chelates*(no date).
Hulls Aktiengesellschaft, DYNASYLAN® (no date).
Merck Pigment Brochure: "Iriodin® WR, Pearl Lustre Pigments for Automotive Paints Supply Program," Issued more than one year prior to Jun. 24, 1994.
Section "A" in Glausch Declaration under 37 C.F.R. § 1.132 re: on sale pigments, more than one year before Jun. 24, 1994.
Volan bonding agents—Dupont—Cr (III) Methacrylate Surface Active Agents, Coupling Agent on Pigments and Mica Fillers (May 1996).

* cited by examiner

*Primary Examiner*—Patricia L Hailey
(74) *Attorney, Agent, or Firm*—Millen, White, Zelano, Branigan, P.C.

(57) ABSTRACT

A pearlescent pigment based on a metal oxide-coated, platelet-shaped substrate and a top layer on the metal oxide layer, where the top layer comprises silicon dioxide, at least one further metal hydroxide or metal oxide hydrate and at least one organic coupling reagent. The further metal hydroxides or metal oxide hydrates are hydroxides or oxide hydrates of cerium, aluminum or zirconium, or mixtures thereof. The coupling reagents employed are organofunctional silanes, zirconium aluminates or metal acid esters.

24 Claims, No Drawings

PEARLESCENT PIGMENT FOR WATER-BORNE SURFACE-COATING SYSTEMS

Matter enclosed in heavy brackets [ ] appears in the original patent but forms no part of this reissue specification; matter printed in italics indicates the additions made by reissue.

The invention relates to surface-modified pearlescent pigments for water-borne surface-coating systems.

BACKGROUND OF THE INVENTION

It is known that titanium dioxide particles present as the pigment component in a surface-coating composition cause oxidative decomposition of the polymer on exposure to ultra-violet rays and moisture, known as whitening. In order to suppress this effect of titanium dioxide, it has been proposed to coat or dope titanium dioxide with compounds of chromium, silicon, aluminum, zinc, phosphorus or zirconium.

EP-A-0 268 918 describes a weathering-resistant pearlescent pigment having a hydrated zirconium oxide coating on the titanium dioxide base pigment, this coating being obtained by hydrolysis of a zirconium salt in the presence of a hypophosphite.

EP-A-0 342 533 describes a weathering-resistant pearlescent pigment having, on the titanium dioxide base pigment, a top layer comprising hydrated zirconium oxide obtained by hydrolysis in the presence of a hypophosphite, and a hydrated metal oxide. The metal oxide can be cobalt oxide, manganese oxide or cerium oxide.

These modified pearlescent pigments have adequate dispersibility and weathering resistance in non-aqueous surface-coating systems. However, they are not suitable for use in water-thinnable surface-coating systems, since they cause the formation of microfine bubbles in the coating film which significantly increases light scattering and thus adversely affects gloss and color. In addition, the distinctness of image (DOI) is greatly reduced and the regeneration capacity of the coating film is impaired.

The Hüls AG company brochure "Dynasylan®-Anwendungen yon organofunktionellen Silanen" [Dynasylan®-Applications of Organofunctional Silanes] discloses silanes as coupling agents between inorganic materials (glass, minerals and metal) and organic polymers (thermosets, thermoplastics and elastomers). In a composite material comprising an inorganic substrate and a polymer, they improve the adhesion and thus the mechanical properties of the composite and, simultaneously, as surface modifiers, hydrophobicize the surface of the substrate and thus improve the wetting by the polymer.

The organofunctional silanes have the following basic structure $$Y—(CH_2)_n—SiX_3,$$

where Y is an organofunctional group, for example an $NH_2$ group, which is rigidly bonded to the silicon via a carbon chain. X is referred to as a silicon-functional group. These are generally alkoxy groups, which, after hydrolysis, react with active sites of an inorganic substrate or with other silicon compounds by condensation and thus form stable bonds.

Attempts to modify the surface of pearlescent pigments with the aid of these organofunctional silanes in order to improve their weathering resistance and to make them suitable for water-thinnable surface-coating systems have given unsatisfactory results. The strength of the bond between the silane and the surface of the substrate is limited. Mechanical stress or weathering effects, as occur, for example, in an automotive paint, break the bond. A further disadvantage is that the coverage of the substrate surface by the silane is incomplete.

SUMMARY OF THE INVENTION

An object of the present invention is therefore to provide a pearlescent pigment having excellent weathering resistance which is suitable for various, chemically different water-thinnable surface coating systems.

Upon further study of the specification and appended claims, further objects and advantages of this invention will become apparent to those skilled in the art.

This object is achieved according to the present invention by a pearlescent pigment based on a metal oxide-coated, platelet-shaped substrate and a top layer on the metal oxide layer, where the top layer comprises silicon dioxide, at least one further metal oxide or metal oxide hydrate and at least one organic coupling reagent. The object is furthermore achieved according to the present invention by a process for the preparation of a pearlescent pigment based on a metal oxide-coated, platelet-shaped substrate and a top layer on the metal oxide layer, in which the metal oxide-coated substrate is suspended in water, in a first step silicic acid is deposited by adding a water-soluble silicate at a pH from 6 to 9, then in a second step, after addition of one or more water-soluble metal salts at a pH from 3 to 7 and heating to from 30° to 100° C., preferably from 40° to 75° C., the metal hydroxides or metal oxide hydrates are partly deposited, in a third step at least one coupling reagent is added and is hydrolyzed at a pH of from 3 to 4, and finally in a fourth step the part of the metals remaining in solution is deposited as hydroxides or oxide hydrates together with the coupling reagent at a pH of from 4 to 8.5, and the pigment is subsequently dried at from 80° to 160° C., preferably at from 120° to 160° C.

The invention furthermore relates to the use of the pigments according to the invention for pigmenting surface-coating compositions or plastics.

The substrates used are pigments which comprise a platelet-shaped material, for example mica, kaolin or glass, and one or more metal oxide layers deposited thereon. The metal oxide layer can comprise, for example, titanium dioxide, titanium dioxide mixed with iron (III) oxide, iron (III) oxide, chromium oxide, zirconium dioxide, tin dioxide or zinc oxide. Pigments of this type are exemplified by those commercially available under the name Iriodin® (manufacturer: E. MERCK, Darmstadt).

The proportion of the total amount of pigment made up by the top layer on the metal oxide coated substrate is from 4 to 20% by weight, preferably from 4 to 10% by weight. Of this, from 1 to 3% by weight is made up by silicon dioxide, from 1 to 5% by weight by further metal oxides and from 2 to 12% by weight by the coupling reagent.

In addition to silicon dioxide, the preferred further metal oxides present in the top layer are aluminum oxide, cerium (III) oxide and zirconium dioxide.

The coupling reagents used are compounds which comprise one or more central atoms and, bonded thereto, hydrolyzable groups and one or more organic radicals carrying functional groups. The central atoms can be silicon, aluminum, zirconium or titanium.

Suitable coupling reagents are zirconium aluminates of the following structure

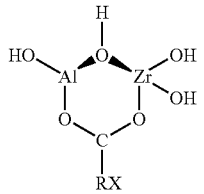

in which X is —$NH_2$, —COOH, —$COO^-$, hydroxyphenyl, methacrylate, carboxyphenyl, alkyl, mercapto, phenyl, —H, vinyl, styryl, melamin, epoxy, aryl or alkyl, and R is —$(CH_2)_n$— in which n can be from 0 to 12. The dotted line in the formula indicates the fourth electron pair of the ring carbon atom used to bond the two oxygen atoms. The triangular bonds in the formula indicate that the oxygen atom has pseudo-bonding to the Zr atom and Al atom, as well as to the hydrogen.

Particularly suitable zirconium aluminates are commercially available under the trade name MANCHEM® (manufacturer: Manchem Limited, Great Britain).

Other suitable coupling reagents are metal acid esters of the following structure $$M^n(OR)_N$$

wherein

M is Zr, Ti or Al n is the valence of the metal, and

R is (i) alkyl of 1–12 carbon atoms or aryl, (ii) alkyl or aryl substituted by —$N(alkyl)_3$, —NH $(alkyl)_2$, —$NH_2$(alkyl), —$NH_3$, —N $(aryl)_3$, —NH $(aryl)_2$ or —$NH_2$ (aryl), where aryl can be substituted by halogen, nitro, amino or hydrogen, (iii) —C-aryl or —C-alkyl.

Particularly suitable metal acid esters are commercially available, e.g., from Hüls AG (manufacturer).

Particularly suitable metal acid esters are acrylate-functional and methacrylamide-functional titanates and methacrylamide-functional zirconates.

Finally, organofunctional silanes according to the invention can be employed as coupling reagents, the following compounds being particularly suitable:

Aminopropyltrimethoxysilane (Dynasilan AMMO)

N-2-Aminoethyl-3-aminopropyltrimethoxysilane (Dynasilan DAMO)

3-Methacryloxypropyltrimethoxysilane (Dynasilan MEMO)

3-Glycidoxypropyltrimethoxysilane(Dynasilan GLYMO), which are marketed by Hüls AG.

The object of the silicon-functional group (methoxy group) is to form hydrogen bridge bonds and chemical bonds to the OH groups of the pigment surface after hydrolysis. This gives a stable bond between the silane and pigment surface. The object of the organofunctional group of the silane is to form bonds to the polymer of the water-borne surface-coating composition.

It is incumbent on the person skilled in the art to select the suitable coupling reagent-modified pigment to match the polymer of the water-borne surface-coating composition. If polyester is used as the polymer in the water-borne system, the pigment should be modified by means of a coupling reagent which contains a methacrylate group as the organo-functional group. If urethane is used as the polymer, an amino-functional coupling reagent should be used to modify the pigment.

By appropriate choice of the coupling reagents, the pigments according to the invention can be matched to the various water-borne surface-coating systems.

The pigments according to the invention are prepared by, in a first step, depositing from 0.1 to 10% by weight, preferably from 0.5 to 3% by weight, of silicon dioxide on the metal oxide layer of the substrate (base pigment). To this end, an aqueous, from 1 to 35%, preferably from 5 to 20%, suspension of the base pigment is treated at a pH from 6 to 9 with a dilute sodium silicate solution. The pH is kept constant by addition of hydrochloric acid, all the stated pH values being determined with the aid of indicator paper.

In a second step, after the pH has been adjusted to a value from 3 to 5, aqueous salt solutions or solid salts of the metals cerium, aluminum or zirconium, or mixtures thereof, in a concentration of from 1 to 4% by weight, based on oxide, are added to an aqueous suspension of the substrate coated in step 1 in the presence of a soluble sulfate, the pH is kept constant at from 3 to 5, and the suspension is heated at from 30° to 100° C., preferably at from 40° to 75° C., with stirring, for from 5 minutes to 4 hours, preferably for from 30 minutes to 2 hours.

Under these conditions, only some, a maximum of 50%, of the metal ions are precipitated as hydroxides or oxide hydrates.

In a third step, from 1 to 20% by weight, preferably from 2 to 12% by weight, of coupling reagent, based on the pigment employed, are then added, the suspension is stirred for from 5 minutes to 4 hours, preferably for from 30 minutes to 2 hours, at a pH from 3 to 5, and the pH is then adjusted to a value of from 5 to 8 over the course of from 5 minutes to 4 hours, preferably from 30 minutes to 2 hours, during which the suspension is kept at a temperature of from 30° to 100° C., preferably from 40° to 75° C.

Under these conditions, all the remaining metal ions are coprecipitated as hydroxides or oxide hydrates together with the coupling reagent.

The pigment is subsequently separated off, washed until free of salt and dried at from 80° to 180° C., preferably at from 120° to 160° C.

The neutral-color pigments obtained in this way have very good weathering resistance, which is confirmed by the test results carried out below. The pigment is on the one hand readily free-flowing and on the other hand has very good suitability for water-thinnable surface-coating systems, in particular automotive paint systems, with respect to dispersibility, stability, coloristic properties, microbubble formation, swelling and gloss.

The pigments according to the invention were tested by the 3 test methods below:

Photoactivity

The pigment samples were incorporated into a plastic matrix, and the extent of reduction of $Pb^{2+}$ to Pb was determined visually. The grey coloration was assessed in accordance with ISO 105, part A 02 (corresponds to DIN 54 001). The test scale extends from 5 (very good) to 1 (very poor).

Water Immersion Test

The pigment samples were incorporated into a conventional surface-coating system, and the test samples were prepared by spray application. The testing was carried out in a one-coat system after 16 hours at 66° C. and after 20 hours at 80° C. The grey coloration was assessed visually in accordance with ISO 105, part A 02 (corresponds to DIN 54 001) 24 hours after completion of the exposure. The assessment scale extends from 5 (very good) to 1 (very poor).

Condensation Water Test

The pigment samples were incorporated into three different water-borne surface-coating systems (A, B, C), and the test samples were prepared by spray application.

The test was carried out in accordance with DIN 50 017 (condensation water/constant climate) one hour after completion of the exposure. The assessment of the bubble frequency was carried out visually in accordance with DIN 53 209. "m" indicates the frequency of bubbles per unit area, and "g" denotes the bubble size. The assessment scale extends from 0 (very good) to 5 (very poor), i.e., the reverse of the two test methods above.

The swelling process was assessed visually in accordance with DIN 53 230, Table 2. In the relevant assessment scale, the number 0 means "unchanged" and the number 5 means "very considerably changed".

Table 1 shows the test results for the pigments prepared in accordance with Examples 1 to 20 as measured by the test methods described above.

The zero sample shown at the end comprised the pure water-borne surface-coating systems without pigment. The zero sample shows that the pure water-borne surface-coating systems also have slight swellings.

In Comparative Examples 1 and 2, Iriodin® 9225 Rutile Pearlescent Blue, a titanium dioxide coated mica pigment, was employed. In Comparative Example 2, it was provided with an additional coating of compounds of chromium and manganese as described in EP 0 104 516, and in Comparative Example 1 it was provided with an additional coating of zirconium oxide hydrate, cerium oxide hydrate and an epoxy silane as described in EP 0 342 533.

In Comparative Examples 3 and 4, Iriodin® 9504 Red, an iron(III) oxide-coated mica pigment, was used. In Comparative Example 3 it was provided with an additional coating as described in EP 0 342 533, and in Comparative Example 4 it was provided with an additional coating as described in EP 0 104 516.

TABLE 1

Test results for the pigments prepared in accordance with Examples 1 to 20

| | | Water immersion test | | Condensation water test on water-thinnable surface-coating systems | | | | | |
|---|---|---|---|---|---|---|---|---|---|
| | Photo- | | | A | | B | | C | |
| Example | activity | 16 h/66° C. | 20 h/80° C. | Bubbles | Swelling | Bubbles | Swelling | Bubbles | Swelling |
| 1 | 5 | 5 | 4-5 | m 0/g 0 | Q 0 | / | / | / | / |
| 2 | 3-4 | 4-5 | 3-4 | m 0/g 0 | Q 0 | m 0/g 0 | Q 3 | m 2/g 1 | Q 2-3 |
| 3 | 3-4 | 4-5 | 3-4 | / | / | m 0/g 0 | Q 2 | / | / |
| 4 | 3-4 | 4-5 | 4-5 | m 1/g 1 | Q 1 | m 0/g 0 | Q 3-4 | m 1/g 2 | Q 2-3 |
| 5 | 3-4 | 4-5 | 4 | m 3/g 1 | Q 0-1 | m 0/g 0 | Q 2-3 | m 0g 0 | Q 3 |
| 6 | 3-4 | 5 | 3-4 | / | / | / | / | m 4/g 1 | Q 2 |
| 7 | 3-4 | 5 | 4 | / | / | / | / | / | / |
| 8 | 3-4 | 5 | 3-4 | / | / | / | / | / | / |
| 9 | 3-4 | 5 | 4 | / | / | m 0/g 0 | Q 1 | m 0/g 0 | Q 3-4 |
| 10 | 3-4 | 5 | 4 | m 0/g 0 | Q 0-1 | m 0/g 0 | Q 1-2 | m 0/g 0 | Q 3-4 |
| 11 | 3-4 | 5 | 4 | m 0/g 0 | Q 0-1 | m 0/9 0 | Q 1-2 | m 0/g 0 | Q 3-4 |
| 12 | 3-4 | 5 | 4 | / | / | m 0/g 0 | Q 2 | / | / |
| 13 | 3-4 | 5 | 4 | m 2/g 1 | Q 0-1 | m 0/g 0 | Q 1-2 | m 0/g 0 | Q 3-4 |
| 14 | 5 | 5 | 4-5 | / | / | / | / | / | / |
| 15 | 5 | 5 | 4-5 | / | / | / | / | / | / |
| 16 | 3-4 | 5 | 3 | / | / | / | / | / | / |
| 17 | 3-4 | 4-5 | 3 | / | / | / | / | / | / |
| 18 | 3-4 | 4-5 | 3-4 | / | / | / | / | / | / |
| 19 | 3-4 | 4-5 | 3-4 | / | / | / | / | / | / |
| 20 | 3-4 | 4-5 | 3 | / | / | / | / | / | / |
| zero sample | / | / | / | m 0/g 0 to m 1-2/g 1 | Q 0 to Q 1 | m 0/g 0 to m 1/g 2 | Q 0-1 to Q 1 | m 0/g 0 | Q 2-3 |

Table 2 shows, for comparison, the test results for the conventional pigments used in Comparative Examples 1 to 4.

TABLE 2

Test results for the conventional pigments used in Comparative Examples 1 to 4

| Water immersion | Condensation water test on water-thinnable surface-coating systems |
|---|---|

| Comparative Example | Photo-activity | test 16 h/66° C. | test 20 h/80° C. | A Bubbles | A Swelling | B Bubbles | B Swelling | C Bubbles | C Swelling |
|---|---|---|---|---|---|---|---|---|---|
| 1 | 3-4 | 3-4 | / | m 0/g 0 to m 3/g 1 | Q 0 to Q 1 | m 0/g 0 | Q 3 Q 3-4 | Q 4 | m 0/g 0 |
| 2 | 3 | 4-5 | / | m 0/g 0 to m 4-5/g 1 | Q 0 to Q 1-2 | m 0/g 0 | Q 3-4 to Q 4 | m g/g 1 | Q 4-5 |
| 3 | 5 | 4-5 | 4 | m 0/g 0 to m 3/g 1 | Q 1 | m 0/g 0 | Q 3-4 to Q 4 | m 0/g 0 | Q 3 |
| 4 | 5 | 4-5 | / | m 0/g 0 | Q 1-2 to Q 3 | m 0/g 0 bis m 1/g 2 | Q 3-4 to Q 5 | m 0/g 0 | Q 3-4 |
| zero sample | / | / | / | m 0/g 0 to m 1-2/g 1 | Q 0 to Q 1 | m 0/g 0 to m 1/g 2 | Q 0-1 to Q 1 | m 0/g 0 | Q 2-3 |

The comparative examples show that the surface-coating systems containing the pigments according to the invention have significantly better swelling behavior than those containing conventional pigments (see water-borne surface-coating system B, Examples 10, 11, and 13).

The Examples below are intended to illustrate the invention without representing a limitation.

In the foregoing and in the following examples, all temperatures are set forth uncorrected in degrees Celsius; and, unless otherwise indicated, all parts and percentages are by weight.

The entire disclosure of all applications, patents and publications, cited above and below, and of corresponding German Application No. P 43 21 005.8, filed Jun. 24, 1993, are hereby incorporated by reference.

EXAMPLE 1

100 g of Iriodin® 504 Red (iron(III) oxide-coated mica pigment from E. Merck, Darmstadt) are suspended in 900 ml of demineralized water, and the suspension is heated to 40° C. with vigorous, stirring.

The pH is adjusted to 9.0 by means of 2.5% sodium hydroxide solution. All the pH values indicated are determined with the aid of suitable pH indicator paper.

A solution of 2.7 ml of sodium water glass (370 g of $SiO_2$ per liter) in 150 ml of demineralized water is subsequently added dropwise over the course of 30 minutes to the pigment suspension. During this addition, the pH is kept constant by means of 2.5% hydrochloric acid. When the addition is complete, the mixture is stirred at 40° C. for a further 15 minutes. The pH is then adjusted to 6.5 over the course of 10 minutes by means of 2.5% hydrochloric acid, and the mixture is stirred at 40° C. for a further 15 minutes. 1.35 g of sodium sulfate, 2.30 g of aluminum chloride hexahydrate and 1.10 g of cerium(III) chloride heptahydrate as solids are then added to the pigment suspension, during which the pH drops to 4.0.

The mixture is subsequently heated to 75° C. over the course of about 20 minutes and stirred at 75° C. for a further 75 minutes, during which the pH drops to 3.3. The metal hydroxides or metal oxide hydrates, at least in part, are precipitated during this time.

3.0 g of pure Dynasilan AMMO (3-aminopropyltrimethoxysilane from Hüls AG, Troisdorf) are then added over the course of 10 minutes. During this addition, the pH is kept constant at 3.3 by means of 2.5% hydrochloric acid. When the addition is complete, the mixture is stirred at 75° C. for a further 2 hours, during which the silane is fully hydrolyzed and becomes reactive. The pH does not change.

The pH is subsequently adjusted to 8.0 very slowly over the course of 60 minutes by means of 2.5% sodium hydroxide solution. During this time, the metal hydroxides or metal oxide hydrates and the silane are coprecipitated completely.

The mixture is subsequently stirred at 75° C. for a further 1 hour to complete the reaction, during which the pH drops to about 7.0.

The product is subsequently filtered off with suction, washed with demineralized water until salt-free and dried at 140° C. for about 16 hours.

EXAMPLE 2

100 g of Iriodin® 225 Rutile Pearlescent Blue (titanium dioxide-coated mica pigment from E. Merck, Darmstadt) are suspended in 900 ml of demineralized water, and the suspension is heated to 40° C. with vigorous stirring. The procedure of Example 1 is then followed as far as the addition of the coupling reagents.

3.0 g of pure Dynasilan AMMO (3-aminopropyltrimethoxysilane from Huls AG, Troisdorf) are then added over the course of 10 minutes. During this addition, the pH is kept constant at 3.3 by means of 2.5% hydrochloric acid.

5.0 g of pure Z 6040 (3-glycidoxypropyltrimethoxysilane from Dow Corning chemicals) are then added over the course of 10 minutes. During this addition, the pH remains constant at 3.3.

13.2 g of pure Manchem C (carboxyzirconium aluminate solution from Rhone-Poulenc Chemicals) are subsequently added over the course of 10 minutes. During this addition, the pH is kept constant at 3.3 by means of 2.5% hydrochloric acid. When the addition is complete, the mixture is stirred at 75° C. for a further 2 hours, during which the silanes and the zirconium aluminate coupling reagent are fully hydrolyzed and become reactive. The pH does not change.

The pH is subsequently adjusted to 8.0 very slowly over the course of 90 minutes by means of 2.5% sodium hydroxide solution. During this time, the metal hydroxides or metal oxide hydrates, silanes of various functionality and zirconium aluminate are coprecipitated completely.

The mixture is subsequently stirred at 75° C. for a further 1 hour to complete the reaction, during which the pH drops to about 7.0.

The product is subsequently filtered off with suction, washed with demineralized water until salt-free and dried at 140° C. for about 16 hours.

EXAMPLE 3

100 g of Iriodin® 225 Rutile Pearlescent Blue (titanium dioxide-coated mica pigment from E. Merck, Darmstadt) are suspended in 900 ml of demineralized water, and the suspension is heated to 40° C. with vigorous stirring. The procedure of Example 1 is then followed as far as the addition of the coupling reagents.

3.0 g of pure Dynasilan MEMO (3-methacryloxypropyltrimethoxysilane from Huls AG, Troisdorf) are then added over the course of 10 minutes. During this addition, the pH remains constant at 3.3.

In addition, 5.0 g of pure Z 6040 (3-glycidoxypropyltrimethoxysilane from Dow Corning chemicals) are then added over the course of 10 minutes. During this addition, the pH remains constant at 3.3.

13.2 g of pure Manchem C (carboxyzirconium aluminate solution from Rhone-Poulenc Chemicals) are subsequently added over the course of 10 minutes.

During this addition, the pH is kept constant at 3.3 by means of 2.5% hydrochloric acid. When the addition is complete, the mixture is stirred at 75° C. for a further 2 hours, during which the silanes and the zirconium aluminate coupling reagent are fully hydrolyzed and become reactive. The pH does not change.

The pH is subsequently adjusted to 8.0 very slowly over the course of 90 minutes by means of 2.5% sodium hydroxide solution. During this time, the metal hydroxides or metal oxide hydrates, silanes of various functionality and zirconium aluminate are coprecipitated completely.

The mixture is subsequently stirred at 75° C. for a further 1 hour to complete the reaction, during which the pH drops to about 7.0.

The product is subsequently filtered off with suction, washed with demineralized water until salt-free and dried at 140° C. for about 16 hours.

EXAMPLE 4

100 g of Iriodin® 225 Rutile Pearlescent Blue (titanium dioxide-coated mica pigment from E. Merck, Darmstadt) are suspended in 900 ml of demineralized water, and the suspension is heated to 40° C. with vigorous stirring. The procedure of Example 1 is then followed as far as the addition of the coupling reagents.

3.5 g of pure Z 6020 (N-2-aminoethyl-3-aminopropyltrimethoxysilane from Dow Corning Chemicals) are then added over the course of 10 minutes. During this addition, the pH is kept constant at 3.3 by means of 2.5% hydrochloric acid.

In addition, 3.0 g of pure Dynasilan MEMO (3-methacryloxypropyltrimethoxysilane from Huls AG, Troisdorf) are then added over the course of 10 minutes. During this addition, the pH remains constant at 3.3.

13.2 g of pure Manchem C (carboxyzirconium aluminate solution from Rhone-Poulenc Chemicals) are subsequently added over the course of 10 minutes. During this addition, the pH is kept constant at 3.3 by means of 2.5% hydrochloric acid. When the addition is complete, the mixture is stirred at 75° C. for a further 2 hours, during which the silanes and the zirconium aluminate coupling reagent are fully hydrolyzed and become reactive. The pH does not change. The pH is subsequently adjusted to 8.0 very slowly over the course of 90 minutes by means of 2.5% sodium hydroxide solution. During this time, the metal hydroxides or metal oxide hydrates, silanes of various functionality and zirconium aluminate are coprecipitated completely.

The mixture is subsequently stirred at 75° C. for a further 1 hour to complete the reaction, during which the pH drops to about 7.0.

The product is subsequently filtered off with suction, washed with demineralized water until salt-free and dried at 140° C. for about 16 hours.

EXAMPLE 5

100 g of Iriodin® 225 Rutile Pearlescent Blue (titanium dioxide-coated mica pigment from E. Merck, Darmstadt) are suspended in 900 ml of demineralized water, and the suspension is heated to 40° C. with vigorous stirring. The procedure of Example 1 is then followed as far as the addition of the coupling reagents.

3.0 g of pure Z 6040 (3-glycidoxypropyltrimethoxysilane from Dow Corning Chemicals) are then added over the course of 10 minutes. During this addition, the pH remains constant at 3.3.

13.2 g of pure Manchem C (carboxyzirconium aluminate solution from Rhone-Poulenc Chemicals) are subsequently added over the course of 10 minutes. During this addition, the pH is kept constant at 3.3 by means of 2.5% hydrochloric acid.

When the addition is complete, the mixture is stirred at 75° C. for a further 2 hours, during which the silane and the zirconium aluminate coupling reagent are fully hydrolyzed and become reactive. The pH does not change.

The pH is subsequently adjusted to 8.0 very slowly over the course of 90 minutes by means of 2.5% sodium hydroxide solution. During this time, the metal hydroxides or metal oxide hydrates, the silane and zirconium aluminate are coprecipitated completely. The mixture is subsequently stirred at 75° C. for a further 1 hour to complete the reaction, during which the pH drops to about 7.0.

The product is subsequently filtered off with suction, washed with demineralized water until salt-free and dried at 140° C. for about 16 hours.

EXAMPLE 6

100 g of Iriodin® 225 Rutile Pearlescent Blue (titanium dioxide-coated mica pigment from E. Merck, Darmstadt) are suspended in 900 ml of demineralized water, and the suspension is heated to 40° C. with vigorous stirring. The procedure of Example 1 is then followed as far as the addition of the coupling reagents.

13.2 g of pure Manchem C (carboxyzirconium aluminate solution from Rhone-Poulenc Chemicals) are subsequently added over the course of 10 minutes. During this addition, the pH is kept constant at 3.3 by means of 2.5% hydrochloric acid.

When the addition is complete, the mixture is stirred at 75° C. for a further 2 hours, during which the zirconium aluminate coupling reagent is fully hydrolyzed and becomes reactive. The pH does not change.

The pH is subsequently adjusted to 8.0 very slowly over the course of 90 minutes by means of 2.5% sodium hydroxide solution. During this time, the metal hydroxides or metal oxide hydrates, and the zirconium aluminate are coprecipitated completely.

The mixture is subsequently stirred at 75° C. for a further 1 hour to complete the reaction, during which the pH drops to about 7.0.

The product is subsequently filtered off with suction, washed with demineralized water until salt-free and dried at 140° C. for about 16 hours.

EXAMPLE 7

100 g of Iriodin® 225 Rutile Pearlescent Blue (titanium dioxide-coated mica pigment from E. Merck, Darmstadt) are suspended in 900 ml of demineralized water, and the suspension is heated to 40° C. with vigorous stirring. The procedure of Example 1 is then followed as far as the addition of the coupling reagents.

14.8 g of pure Manchem A (aminozirconium aluminate solution from Rhône Poulenc Chemicals) are subsequently added over the course of 10 minutes. During this addition, the pH remains constant at 3.3.

When the addition is complete, the mixture is stirred at 75° C. for a further 2 hours, during which the zirconium aluminate coupling reagent is fully hydrolyzed and becomes reactive. The pH does not change.

The pH is subsequently adjusted to 8.0 very slowly over the course of 90 minutes by means of 2.5% sodium hydroxide solution. During this time, the metal hydroxides or metal oxide hydrates, and zirconium aluminate are coprecipitated completely.

The mixture is subsequently stirred at 75° C. for a further 1 hour to complete the reaction, during which the pH drops to about 7.0.

The product is subsequently filtered off with suction, washed with demineralized water until salt-free and dried at 140° C. for about 16 hours.

EXAMPLE 8

100 g of Iriodin® 225 Rutile Pearlescent Blue (titanium dioxide-coated mica pigment from E. Merck, Darmstadt) are suspended in 900 ml of demineralized water, and the suspension is heated to 40° C. with vigorous stirring. The procedure of Example 1 is then followed as far as the addition of the coupling reagents.

14.8 g of pure Manchem M (methacrylzirconium aluminate solution from Rhone Poulenc Chemicals) are subsequently added over the course of 10 minutes. During this addition, the pH remains constant at 3.3.

When the addition is complete, the mixture is stirred at 75° C. for a further 2 hours, during which the zirconium aluminate coupling reagent is fully hydrolyzed and becomes reactive. The pH does not change.

The pH is subsequently adjusted to 8.0 very slowly over the course of 90 minutes by means of 2.5% sodium hydroxide solution. During this time, the metal hydroxides or metal oxide hydrates, and zirconium aluminate are coprecipitated completely.

The mixture is subsequently stirred at 75° C. for a further 1 hour to complete the reaction, during which the pH drops to about 7.0.

The product is subsequently filtered off with suction, washed with demineralized water until salt-free and dried at 140° C. for about 16 hours.

EXAMPLE 9

100 g of Iriodin® 225 Rutile Pearlescent Blue (titanium dioxide-coated mica pigment from E. Merck, Darmstadt) are suspended in 900 ml of demineralized water, and the suspension is heated to 40° C. with vigorous stirring. The procedure of Example 1 is then followed as far as the addition of the coupling reagents.

3.0 g of pure Dynasilan MEMO (3-methacryloxypropyltrimethoxysilane from Huls AG, Troisdorf) are then added over the course of 10 minutes. During this addition, the pH remains constant at 3.3.

3.0 g of pure Z 6040 (3-glycidoxypropyltrimethoxysilane from Dow Corning Chemicals) are then added over the course of 10 minutes. During this addition, the pH remains constant at 3.3.

When the addition is complete, the mixture is stirred at 75° C. for a further 2 hours, during which the silanes are fully hydrolyzed and become reactive. The pH does not change.

The pH is subsequently adjusted to 8.0 very slowly over the course of 90 minutes by means of 2.5% sodium hydroxide solution. During this time, the metal hydroxides or metal oxide hydrates and the silanes are coprecipitated completely.

The mixture is subsequently stirred at 75° C. for a further 1 hour to complete the reaction, during which the pH drops to about 7.0.

The product is subsequently filtered off with suction, washed with demineralized water until salt-free and dried at 140° C. for about 16 hours.

EXAMPLE 10

100 g of Iriodin® 225 Rutile Pearlescent Blue (titanium dioxide-coated mica pigment from E. Merck, Darmstadt) are suspended in 900 ml of demineralized water, and the suspension is heated to 40° C. with vigorous stirring. The procedure of Example 1 is then followed as far as the addition of the coupling reagents.

3.0 g of pure Dynasilan AMMO (3-aminopropyltrimethoxysilane from Huls AG, Troisdorf) are then added over the course of 10 minutes. During this addition, the pH is kept constant at 3.3 by means of 2.5% hydrochloric acid.

In addition, 3.0 g of pure Dynasilan MEMO (3-methacryloxypropyltrimethoxysilane from Huls AG, Troisdorf) are added over the course of 10 minutes. During this addition, the pH remains constant at 3.3.

3.0 g of pure Z 6040 (3-glycidoxypropyltrimethoxysilane from Dow Corning Chemicals) are then added over the course of 10 minutes. During this addition, the pH remains constant at 3.3.

When the addition is complete, the mixture is stirred at 75° C. for a further 2 hours, during which the silanes are fully hydrolyzed and become reactive. The pH does not change.

The pH is subsequently adjusted to 8.0 very slowly over the course of 60 minutes by means of 2.5% sodium hydroxide solution. During this time, the metal hydroxides or metal oxide hydrates and the silanes are coprecipitated completely.

The mixture is subsequently stirred at 75° C. for a further 1 hour to complete the reaction, during which the pH drops to about 7.0.

The product is subsequently filtered off with suction, washed with demineralized water until salt-free and dried at 140° C. for about 16 hours.

EXAMPLE 11

100 g of Iriodin® 225 Rutile Pearlescent Blue (titanium dioxide-coated mica pigment from E. Merck, Darmstadt) are suspended in 900 ml of demineralized water, and the suspension is heated to 40° C. with vigorous stirring. The procedure of Example 1 is then followed as far as the addition of the coupling reagents.

3.0 g of pure Dynasilan AMMO (3-aminopropyltrimethoxysilane from Huls AG, Troisdorf) are then added over the course of 10 minutes. During this addition, the pH is kept constant at 3.3 by means of 2.5% hydrochloric acid. In addition, 3.0 g of pure Dynasilan MEMO (3-methacryloxypropyltrimethoxysilane from Huls AG, Troisdorf) are added over the course of 10 minutes. During this addition, the pH remains constant at 3.3.

When the addition is complete, the mixture is stirred at 75° C. for a further 2 hours. During this addition the silanes are fully hydrolyzed and become reactive. The pH does not change.

The pH is subsequently adjusted to 8.0 very slowly over the course of 60 minutes by means of 2.5% sodium hydroxide solution. During this time, the metal hydroxides or metal oxide hydrates and the silanes are coprecipitated completely.

The mixture is subsequently stirred at 75° C. for a further 1 hour to complete the reaction, during which the pH drops to about 7.0.

The product is subsequently filtered off with suction, washed with demineralized water until salt-free and dried at 140° C. for about 16 hours.

EXAMPLE 12

100 g of Iriodin® 225 Rutile Pearlescent Blue (titanium dioxide-coated mica pigment from E. Merck, Darmstadt) are suspended in 900 ml of demineralized water, and the suspension is heated to 40° C. with vigorous stirring. The procedure of Example 1 is then followed as far as the addition of the coupling reagents.

3.0 g of pure Dynasilan AMMO (3-aminopropyltrimethoxysilane from Huls AG, Troisdorf) are then added over the course of 10 minutes. During this addition, the pH is kept constant at 3.3 by means of 2.5% hydrochloric acid. In addition, 3.0 g of pure Z 6040 (3-glycidoxypropyltrimethoxysilane from Dow Corning Chemicals) are then added over the course of 10 minutes. During this addition, the pH remains constant at 3.3.

When the addition is complete, the mixture is stirred at 75° C. for a further 2 hours, during which the silanes are fully hydrolyzed and become reactive. The pH does not change.

The pH is subsequently adjusted to 8.0 very slowly over the course of 60 minutes by means of 2.5% sodium hydroxide solution. During this time, the metal hydroxides or metal oxide hydrates and the silanes are coprecipitated completely.

The mixture is subsequently stirred at 75° C. for a further 1 hour to complete the reaction, during which the pH drops to about 7.0.

The product is subsequently filtered off with suction, washed with demineralized water until salt-free and dried at 140° C. for about 16 hours.

EXAMPLE 13

100 g of Iriodin® 225 Rutile Pearlescent Blue (titanium dioxide-coated mica pigment from E. Merck, Darmstadt) are suspended in 900 ml of demineralized water, and the suspension is heated to 40° C. with vigorous stirring. The procedure of Example 1 is then followed as far as the addition of the coupling reagents.

3.5 g of pure Z 6020 (N-2-aminoethyl-3-aminopropyltrimethoxysilane from Dow Corning Chemicals) are then added over the course of 10 minutes. During this addition, the pH remains constant at 3.3 by means of 2.5% hydrochloric acid.

In addition, 3.0 g of pure Dynasilan MEMO (3-methacryloxypropyltrimethoxysilane from Huls AG, Troisdorf) are added over the course of 10 minutes. During this addition, the pH remains constant at 3.3.

3.0 g of pure Z 6040 (3-glycidoxypropyltrimethoxysilane from Dow Corning Chemicals) are then added over the course of 10 minutes. During this addition, the pH remains constant at 3.3.

When the addition is complete, the mixture is stirred at 75° C. for a further 2 hours, during which the silanes are fully hydrolyzed and become reactive. The pH does not change.

The pH is subsequently adjusted to 8.0 very slowly over the course of 60 minutes by means of 2.5% sodium hydroxide solution. During this time, the metal hydroxides or metal oxide hydrates and the silanes are coprecipitated completely.

The mixture is subsequently stirred at 75° C. for a further 1 hour to complete the reaction, during which the pH drops to about 7.0.

The product is subsequently filtered off with suction, washed with demineralized water until salt-free and dried at 140° C. for about 16 hours.

EXAMPLE 14

100 g of Iriodin® 504 Red (iron (III) oxide-coated mica pigment from E. Merck, Darmstadt) are suspended in 900 ml of demineralized water, and the suspension is heated to 40° C. with vigorous stirring.

The pH is adjusted to 9.0 by means of 2.5% sodium hydroxide solution. All the pH values indicated are determined with the aid of suitable pH indicator paper.

A solution of 5.4 ml of sodium water glass (370 g of $SiO_2$ per liter) in 150 ml of demineralized water is subsequently added dropwise over the course of 30 minutes to the pigment suspension. During this addition, the pH is kept constant by means of 2.5% hydrochloric acid. When the addition is complete, the mixture is stirred at 40° C. for a further 15 minutes. The pH is then adjusted to 6.5 over the course of 10 minutes by means of 2.5 hydrochloric acid, and the mixture is stirred at 40° C. for a further 15 minutes. 2.70 g of sodium sulfate, 4.60 g of aluminum chloride hexahydrate and 1.10 of cerium (III) chloride heptahydrate as solids are then added to the pigment suspension, during which the pH drops to 4.0.

The mixture is subsequently heated to 75° C. over the course of about 20 minutes and stirred at 75° C. for a further 75 minutes, during which the pH drops to 3.3. The metal hydroxides or metal oxide hydrates, at least in part, are precipitated during this time.

3.0 g of pure Dynasilan AMMO (3-aminopropyltrimethoxysilane from Huls AG, Troisdorf) are then added over the course of 10 minutes. During this addition, the pH is kept constant at 3.3 by means of 2.5% hydrochloric acid. When the addition is complete, the mixture is stirred at 75° C. for a further 2 hours, during which the silane is fully hydrolyzed and becomes reactive. The pH does not change.

The pH is subsequently adjusted to 8.0 very slowly over the course of 60 minutes by means of 2.5% sodium hydroxide solution. During this time, the metal hydroxides or metal oxide hydrates and the silane are coprecipitated completely.

The mixture is subsequently stirred at 75° C. for a further 1 hour to complete the reaction, during which the pH drops to about 7.0.

The product is subsequently filtered off with suction, washed with demineralized water until salt-free and dried at 140° C. for about 16 hours.

EXAMPLE 15

100 g of Iriodin® 504 Red (iron (III) oxide-coated mica pigment from E. Merck, Darmstadt) are suspended in 900 ml of demineralized water, and the suspension is heated to 40° C. with vigorous stirring.

The pH is adjusted to 9.0 by means of 2.5% sodium hydroxide solution. All the pH values indicated are determined with the aid of suitable pH indicator paper.

A solution of 8.1 ml of sodium water glass (370 g of $SiO_2$ per liter) in 150 ml of demineralized water is subsequently added dropwise over the course of 30 minutes to the pigment suspension. During this addition, the pH is kept constant by means of 2.5% hydrochloric acid. When the addition is complete, the mixture is stirred at 40° C. for a further 15 minutes. The pH is then adjusted to 6.5 over the course of 10 minutes by means of 2.5% hydrochloric acid, and the mixture is stirred at 40° C. for a further 15 minutes. 4.05 g of sodium sulfate, 6.90 g of aluminum chloride hexahydrate and 1.10 g of cerium (III) chloride heptahydrate as solids are then added to the pigment suspension, during which the pH drops to 4.0.

The mixture is subsequently heated to 75° C. over the course of about 20 minutes and stirred at 75° C. for a further 75 minutes, during which the pH drops to 3.3. The metal hydroxides or metal oxide hydrates, at least in part, are precipitated during this time.

3.0 g of pure Dynasilan AMMO (3-aminopropyltrimethoxysilane from Huls AG, Troisdorf) are then added over the course of 10 minutes. During this addition, the pH is kept constant at 3.3 by means of 2.5% hydrochloric acid. When the addition is complete, the mixture is stirred at 75° C. for a further 2 hours, during which the silane is fully hydrolyzed and becomes reactive. The pH does not change.

The pH is subsequently adjusted to 8.0 very slowly over the course of 60 minutes by means of 2.5% sodium hydroxide solution. During this time, the metal hydroxides or metal oxide hydrates and the silane are coprecipitated completely.

The mixture is subsequently stirred at 75° C. for a further 1 hour to complete the reaction, during which the pH drops to about 7.0.

The product is subsequently filtered off with suction, washed with demineralized water until salt-free and dried at 140° C. for about 16 hours.

EXAMPLE 16

100 g of Iriodin® 225 Rutile (Pearlescent Blue titanium dioxide-coated mica pigment from E. Merck, Darmstadt) are suspended in 900 ml of demineralized water, and the suspension is heated to 40° C. with vigorous stirring.

The pH is adjusted to 9.0 by means of 2.5% sodium hydroxide solution. All the pH values indicated are determined with the aid of suitable pH indicator paper.

A solution of 2.7 ml of sodium water glass (370 g of $SiO_2$ per liter) in 150 ml of demineralized water is subsequently added dropwise over the course of 30 minutes to the pigment suspension. During this addition, the pH is kept constant by means of 2.5% hydrochloric acid. When the addition is complete, the mixture is stirred at 40° C. for a further 15 minutes. The pH is then adjusted to 6.5 over the course of 10 minutes by means of 2.5% hydrochloric acid, and the mixture is stirred at 40° C. for a further 15 minutes. 1.35 g of sodium sulfate, 2.30 g of aluminum chloride hexahydrate and 1.70 g of cerium (III) chloride heptahydrate as solids are then added to the pigment suspension, during which the pH drops to 4.0.

The mixture is subsequently heated to 75° C. over the course of about 20 minutes and stirred at 75° C. for a further 75 minutes, during which the pH drops to 3.3. The metal hydroxides or metal oxide hydrates, at least in part, are precipitated during this time.

3.0 g of pure Dynasilan MEMO (3-methacryloxypropyltrimethoxysilane from Huls AG, Troisdorf) are then added over the course of 10 minutes. During this addition, the pH remains constant at 3.3. When the addition is complete, the mixture is stirred at 75° C. for a further 2 hours, during which the silane is fully hydrolyzed and becomes reactive. The pH does not change.

The pH is subsequently adjusted to 8.0 very slowly over the course of 60 minutes by means of 2.5% sodium hydroxide solution. During this time, the metal hydroxides or metal oxide hydrates and the silane are coprecipitated completely. The mixture is subsequently stirred at 75° C. for a further 1 hour to complete the reaction, during which the pH drops to about 7.0.

The product is subsequently filtered off with suction, washed with demineratized water until salt-free and dried at 140° C. for about 16 hours.

EXAMPLE 17

100 g of Iriodin® 225 Rutile (Pearlescent Blue titanium dioxide-coated mica pigment from E. Merck, Darmstadt) are suspended in 900 ml of demineralized water, and the suspension is heated to 40° C. with vigorous stirring.

The pH is adjusted to 9.0 by means of 2.5% sodium hydroxide solution. All the pH values indicated are determined with the aid of suitable pH indicator paper.

A solution of 2.7 ml of sodium water glass (370 g of $SiO_2$ per liter) in 150 ml of demineralized water is subsequently added dropwise over the course of 30 minutes to the pigment suspension. During this addition, the pH is kept constant by means of 2.5% hydrochloric acid. When the addition is complete, the mixture is stirred at 40° C. for a further 15 minutes. The pH is then adjusted to 6.5 over the course of 10 minutes by means of 2.5% hydrochloric acid, and the mixture is stirred at 40° C. for a further 15 minutes. 1.35 g of sodium sulfate, 2.30 g of aluminum chloride hexahydrate and 2.25 g of cerium (III) chloride heptahydrate as solids are then added to the pigment suspension, during which the pH drops to 4.0.

The mixture is subsequently heated to 75° C. over the course of about 20 minutes and stirred at 75° C. for a further 75 minutes, during which the pH drops to 3.3. The metal hydroxides or metal oxide hydrates, at least in part, are precipitated during this time.

3.0 g of pure Dynasilan MEMO (3-methacryloxypropyltrimethoxysilane from Huls AG, Troisdorf) are then added over the course of 10 minutes. During this addition, the pH remains constant at 3.3. When the addition is complete, the mixture is stirred at 75° C. for a further 2 hours, during which the silane is fully hydrolyzed and becomes reactive. The pH does not change.

The pH is subsequently adjusted to 8.0 very slowly over the course of 60 minutes by means of 2.5% sodium hydroxide solution. During this time, the metal hydroxides or metal oxide hydrates and the silane are coprecipitated completely.

The mixture is subsequently stirred at 75° C. for a further 1 hour to complete the reaction, during which the pH drops to about 7.0.

The product is subsequently filtered off with suction, washed with demineralized water until salt-free and dried at 140° C. for about 16 hours.

EXAMPLE 18

100 g of Iriodin® 225 Rutile Pearlescent Blue (titanium dioxide-coated mica pigment from E. Merck, Darmstadt) are suspended in 900 ml of demineralized water, and the suspension is heated to 40° C. with vigorous stirring.

The pH is adjusted to 9.0 by means of 2.5% sodium hydroxide solution. All the pH values indicated are determined with the aid of suitable pH indicator paper.

A solution of 2.7 ml of sodium water glass (370 g of $SiO_2$ per liter) in 150 ml of demineralized water is subsequently added dropwise over the course of 30 minutes to the pigment suspension. During this addition, the pH is kept constant by means of 2.5% hydrochloric acid. When the addition is complete, the mixture is stirred at 40° C. for a further 15 minutes. The pH is then adjusted to 6.5 over the course of 10 minutes by means of 2.5 hydrochloric acid, and the mixture is stirred at 40° C. for a further 15 minutes.

A solution of 1.35 g of sodium sulfate, 2.30 g aluminum chloride hexahydrate and 1.10 g of cerium (III) chloride heptahydrate, 2.62 g of zirconium (IV) oxide chloride octahydrate and 2 ml of 10% hydrochloric acid, dissolved in 100 ml of demineralized water, are subsequently added dropwise to the pigment suspension over the course of 15 minutes, during which the pH drops to 2.5.

The mixture is subsequently heated to 75° C. over the course of about 20 minutes and stirred at 75° C. for a further 75 minutes, during which the pH drops to 2.3. The metal hydroxides or metal oxide hydrates, at least in part, are precipitated during this time.

A solution of 3.0 g of Dynasilan AMMO (3-aminopropyltrimethoxysilane from Huls AG, Troisdorf) dissolved in 200 ml of demineralized water (= complete silane hydrolysis) is then added dropwise to the pigment suspension over the course of 15 minutes, during which the pH rises to 3.9.

When the addition is complete, the mixture is stirred at 75° C. for a further two hours. During this addition, the pH drops to 3.6.

The pH is subsequently adjusted to 8.0 very slowly over the course of 60 minutes by means of 2.5% sodium hydroxide solution. During this time, the metal hydroxides or metal oxide hydrates and the silane are coprecipitated completely.

The mixture is subsequently stirred at 75° C. for a further 1 hour to complete the reaction, during which the pH drops to about 7.0.

The product is subsequently filtered off with suction, washed with demineralized water until salt-free and dried at 140° C. for about 16 hours.

EXAMPLE 19

100 g of Iriodin® 225 Rutile Pearlescent Blue (titanium dioxide-coated mica pigment from E. Merck, Darmstadt) are suspended in 900 ml of demineralized water, and the suspension is heated to 40° C. with vigorous stirring.

The pH is adjusted to 9.0 by means of 2.5% sodium hydroxide solution. All the pH values indicated are determined with the aid of suitable pH indicator paper.

A solution of 2.7 ml of sodium water glass (370 g of $SiO_2$ per liter) in 150 ml of demineralized water is subsequently added dropwise over the course of 30 minutes to the pigment suspension. During this addition, the pH is kept constant by means of 2.5% hydrochloric acid. When the addition is complete, the mixture then adjusted 40° C. for a further 15 minutes. The pH is adjusted to 6.5 over the course of 10 minutes by means of 2.5% hydrochloric acid, and the mixture is-stirred at 40° C. for a further 15 minutes.

A solution of 1.35 g of sodium sulfate, 2.30 g of aluminum chloride hexahydrate and 1.10 g of cerium (III) chloride heptahydrate, 2.62 g of zirconium (IV) oxide chloride octahydrathydrochloric acid, dissolved in 100 ml of demineralized water, are subsequently added dropwise to the pigment suspension over the course of 15 minutes, during which the pH drops to 2.5.

The mixture is subsequently heated to 75° C. over the course of about 20 minutes and stirred at 75° C. for a further 75 minutes, during which the pH drops to 2.3. The metal hydroxides or metal oxide hydrates, at least in part, are precipitated during this time.

The pH is subsequently adjusted to 3.0 very slowly over the course of 20 minutes by means of 2.5% sodium hydroxide solution (= preneutralization).

A solution of 3.0 g of Dynasilan AMMO (3-aminopropyltrimethoxysilane from Huls AG, Troisdorf) dissolved in 200 ml of demineralized water (= complete silane hydrolysis) is then added dropwise to the pigment suspension over the course of 15 minutes, during which the pH rises to 4. 2.

When the addition is complete, the mixture is stirred at 75° C. for a further 2 hours. During this addition, the pH drops to 3.6.

The pH is subsequently adjusted to 8.0 very slowly over the course of 40 minutes by means of 2.5% sodium hydroxide solution. During this time, the metal hydroxides or metal oxide hydrates and the silane are coprecipitated completely.

The mixture is subsequently stirred at 75° C. for a further 1 hour to complete the reaction, during which the pH drops to about 7.0.

The product is subsequently filtered off with suction, washed with demineralized water until salt-free and dried at 140° C. for about 16 hours.

EXAMPLE 20

100 g of Iriodin® 225 Rutile Pearlescent Blue (titanium dioxide-coated mica pigment from E. Merck, Darmstadt) are suspended in 900 ml of demineralized water, and the suspension is heated to 40° C. with vigorous stirring.

The pH is adjusted to 9.0 by means of 2.5% sodium hydroxide solution. All the pH values indicated are determined with the aid of suitable pH indicator paper.

A solution of 2.7 ml of sodium water glass (370 g of $SiO_2$ per liter) in 150 ml of demineralized water is subsequently added dropwise over the course of 30 minutes to the pigment suspension. During this addition, the pH is kept constant by means of 2.5% hydrochloric acid. When the addition is complete, the mixture is stirred at 40° C. for a further 15 minutes. The pH is then adjusted to 6.5 over the course of 10 minutes by means of 2.5% hydrochloric acid, and the mixture is stirred at 40° C. for a further 15 minutes.

A solution of 1.35 g of sodium sulfate, 2.30 g of aluminum chloride hexahydrate and 1.10 g of cerium (III) chloride heptahydrate, 2.62 g of zirconium (IV) oxide chloride octahydrate and 2 ml of 10% hydrochloric acid, dissolved in 100 ml of demineralized water, are subsequently added dropwise to the pigment suspension over the course of 15 minutes, during which the pH drops to 2.5.

The mixture is subsequently heated to 75° C. over the course of about 20 minutes and stirred at 75° C. for a further 75 minutes, during which the pH drops to 2.3. The metal hydroxides or metal oxide hydrates, at least in part, are precipitated during this time.

The pH is subsequently adjusted to 4.0 very slowly over the course of about 35 minutes by means of 2.5% sodium hydroxide solution (= preneutralization).

A solution of 3.0 g of Dynasilan AMMO (3-aminopropyltrimethoxysilane from Huls AG, Troisdorf) dissolved in 200 ml of demineralized water (= complete silane hydrolysis) is then added dropwise to the pigment suspension over the course of 15 minutes, during which the pH rises to 4.8.

When the addition is complete, the mixture is stirred at 75° C. for a further two hours. During this addition, the pH drops to 4.6.

The pH is subsequently adjusted to 8.0 very slowly over the course of 25 minutes by means of 2.5% sodium hydroxide solution. During this time, the metal hydroxides or metal oxide hydrates and the silane are coprecipitated completely.

The mixture is subsequently stirred at 75° C. for a further 1 hour to complete the reaction, during which the pH drops to about 7.0.

The product is subsequently filtered off with suction, washed with demineralized water until salt-free and dried at 140° C. for about 16 hours.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A pearlescent pigment comprising a [metal oxide] *titanium dioxide*-coated, platelet-shaped substrate and a top layer on the [metal oxide] *titanium dioxide* coating, wherein the top layer comprises silicon dioxide, at least one metal hydroxide or metal oxide hydrate and at least one organic coupling reagent *and is chromium free*.

2. A pearlescent pigment according to claim 1, wherein the metal hydroxide or metal oxide hydrate is a hydroxide or oxyhydrate of cerium, aluminum or zirconium.

3. A pearlescent pigment according to claim 1, wherein the coupling reagent is a zirconium aluminate, a metal acid ester or an organofunctional silane.

4. A process for the preparation of a pearlescent pigment comprising a [metal oxide] *titanium dioxide*-coated, platelet-shaped substrate and a top layer on the [metal oxide] *titanium dioxide* coating, comprising suspending the [metal oxide] *titanium dioxide*-coated substrate in water, depositing silicic acid by adding a water-soluble silicate at a pH from 6 to 9, then, after adding one or more water-soluble metal salts at a pH from 3 to 7 and heating to from 30° to 100° C., partly depositing the metal hydroxides or metal oxide hydrates, adding at least one coupling reagent and hydrolyzing at a pH from 3 to 4, and depositing the part of the metals remaining in solution as hydroxides or oxide hydrates together with the coupling reagent at a pH of from 4 to 8.5, and subsequently drying the pigment from 80° to 160° C.

5. The process according to claim 4, wherein the metal hydroxide or metal oxide hydrate is a hydroxide or oxyhydrate of aluminum, cerium or zirconium.

6. The process according to claim 4, wherein the coupling reagent is a zirconium aluminate, a metal acid ester or an organofunctional silane.

7. The process of claim 4, [wherein] *comprising*, after adding one or more water-soluble metal salts, heating at from 40° to 75° C.

8. The process of claim 4, wherein subsequent drying of the pigment is at 120° C. to 160° C.

9. The pigment of claim 1, wherein the [metal oxide] *titanium dioxide*-coated, platelet-shaped substrate is mica, kaolin or glass [coated with titanium dioxide, titanium dioxide mixed with iron (III) oxide, iron (III) oxide, chromium oxide, zirconium dioxide, tin dioxide or zinc oxide].

10. The pigment of claim 1, wherein the top layer constitutes 4 to 20% by weight of the pigment.

11. The pigment of claim 1, wherein the silicon dioxide in the top layer constitutes 1 to 3% by weight of the pigment, the at least one metal hydroxide or metal oxide hydrate in the top layer constitutes 1 to 5% by weight of the pigment and the coupling reagent in the top layer constitutes 2 to 12% by weight of the pigment.

12. The pigment of claim 1, wherein the top layer is formed by depositing silicon dioxide on the substrate, subsequently depositing a portion of the metal hydroxide or metal oxide hydrate thereon and, then, depositing the remaining metal hydroxide or metal oxide hydrate and the coupling reagent, simultaneously, thereon.

13. The pigment of claim 2, wherein a maximum of 50% by weight of the metal hydroxide or metal oxide hydrate [are] *is* deposited in the initial deposition without the coupling reagent.

*14. The pigment of claim 1, which consists of said coated substrate and top layer and wherein the top layer consists essentially of silicon dioxide, at least one metal hydroxide or metal oxide hydrate and at least one organic coupling reagent.*

*15. The pigment of claim 1, wherein the top layer comprises silicon dioxide, at least one metal hydroxide or metal oxide hydrate of cerium, and at least one organofunctional silane.*

*16. A pearlescent pigment comprising a titanium dioxide-coated, platelet-shaped substrate and a top layer on the titanium dioxide coating, wherein the top layer consists of silicon dioxide, at least one metal hydroxide or metal oxide hydrate of cerium, aluminum or zirconium, and at least one organic coupling reagent which is zirconium aluminate, a metal acid ester or an organofunctional silane.*

*17. A pearlescent pigment comprising a titanium dioxide-coated, platelet-shaped substrate and a top layer on the titanium dioxide coating, wherein the top layer consists of silicon dioxide, a metal hydroxide or metal oxide hydrate of cerium, and at least one organofunctional silane.*

*18. A pearlescent pigment comprising a titanium dioxide-coated, platelet-shaped substrate and a top layer on the titanium dioxide coating, wherein the pearlescent pigment is chromium-free and wherein the top layer comprises silicon dioxide, at least one metal hydroxide or metal oxide hydrate and at least one organic coupling reagent.*

*19. A pearlescent pigment consisting of a titanium dioxide-coated, platelet-shaped substrate and a top layer on the titanium dioxide coating, wherein the top layer consists of silicon dioxide, at least one metal hydroxide or metal oxide hydrate and at least one organic coupling reagent.*

*20. The pigment of claim 1 wherein the top layer comprises sublayers.*

*21. The pigment of claim 15 wherein the top layer comprises sublayers.*

*22. The pigment of claim 18 wherein the top layer comprises sublayers.*

*23. The pigment of claim 19 wherein the top layer comprises sublayers.*

*24. A pearlescent pigment prepared by the process of claim 4.*

* * * * *